US 10,666,672 B2

(12) United States Patent
Arnell et al.

(10) Patent No.: US 10,666,672 B2
(45) Date of Patent: May 26, 2020

(54) COLLECTING DOMAIN NAME SYSTEM TRAFFIC

(71) Applicant: Hewlett Packard Enterprise Development LP, Houston, TX (US)

(72) Inventors: Simon Ian Arnell, Aldershot (GB); Marco Casassa Mont, Bristol (GB); Yolanta Beresna, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 274 days.

(21) Appl. No.: 15/577,865

(22) PCT Filed: Aug. 31, 2015

(86) PCT No.: PCT/US2015/047691
§ 371 (c)(1),
(2) Date: Nov. 29, 2017

(87) PCT Pub. No.: WO2017/039602
PCT Pub. Date: Mar. 9, 2017

(65) Prior Publication Data
US 2018/0139224 A1     May 17, 2018

(51) Int. Cl.
*H04L 29/06* (2006.01)
*H04L 29/12* (2006.01)
(Continued)

(52) U.S. Cl.
CPC .......... *H04L 63/1425* (2013.01); *H04L 12/22* (2013.01); *H04L 29/06* (2013.01);
(Continued)

(58) Field of Classification Search
CPC . H04L 63/1425; H04L 41/12; H04L 61/1511; H04L 61/6009; H04L 63/145
See application file for complete search history.

(56) References Cited

U.S. PATENT DOCUMENTS 8,347,394 B1    1/2013  Lee
8,447,856 B2 *  5/2013  Drako ............... H04L 29/12066
                                                  709/203
(Continued)

FOREIGN PATENT DOCUMENTS

CN   101986642 A    3/2011
CN   102301682 A   12/2011
(Continued)

OTHER PUBLICATIONS

Antonakakis, M. et al.; "Detecting Malware Domains at the Upper DNS Hierarchy"; Jun. 6, 2011; 16 pages.
(Continued)

*Primary Examiner* — Joseph P Hirl
*Assistant Examiner* — Stephen T Gundry
(74) *Attorney, Agent, or Firm* — Hewlett Packard Enterprise Patent Department (57) ABSTRACT

Examples relate to collecting domain name system traffic. In one example, a computing device may: receive, from a first intermediary network device, a DNS query packet that was sent by a client computing device operating on a private network, the DNS query packet specifying i) a query domain name, and ii) a source address that specifies the client computing device; store, in a data storage device, a query record specifying the query domain name and the source address specified by the DNS query packet; receive, from a second intermediary network device, a DNS response packet; determine that the DNS response packet specifies a response domain name that matches the query domain name; in response to the determination, extract, from the DNS response packet, a resolved address that corresponds to the response domain name; and store, in the query record, the resolved address specified by the DNS response packet.

17 Claims, 4 Drawing Sheets

(51) Int. Cl.
*H04L 12/22* (2006.01)
*H04L 12/24* (2006.01)
*G06F 21/55* (2013.01)

(52) U.S. Cl.
CPC .......... *H04L 41/12* (2013.01); *H04L 61/1511* (2013.01); *H04L 61/6009* (2013.01); *H04L 63/145* (2013.01); *H04L 63/1408* (2013.01); *G06F 21/552* (2013.01)

(56) References Cited

U.S. PATENT DOCUMENTS

| | | | | |
|---|---|---|---|---|
| 8,613,089 | B1* | 12/2013 | Holloway | H04L 63/1416 726/23 |
| 8,621,556 | B1* | 12/2013 | Bharali | H04L 61/1511 726/1 |
| 8,631,489 | B2 | 1/2014 | Antonakakis et al. | |
| 8,661,544 | B2* | 2/2014 | Yen | H04L 63/1441 726/24 |
| 8,910,285 | B2 | 12/2014 | Kolbitsch et al. | |
| 8,977,728 | B1* | 3/2015 | Martini | H04L 61/1511 709/222 |
| 9,325,735 | B1* | 4/2016 | Xie | H04L 63/145 |
| 9,779,113 | B2* | 10/2017 | Beevers | G06F 16/29 |
| 2005/0259645 | A1* | 11/2005 | Chen | H04L 29/12066 370/389 |
| 2007/0180090 | A1 | 8/2007 | Fleischman et al. | |
| 2010/0131646 | A1* | 5/2010 | Drako | H04L 29/12066 709/225 |
| 2012/0023153 | A1* | 1/2012 | Karasaridis | H04L 61/1511 709/203 |
| 2012/0054869 | A1* | 3/2012 | Yen | H04L 29/12066 726/24 |
| 2013/0198803 | A1* | 8/2013 | Osterweil | H04L 61/1511 726/1 |
| 2013/0347114 | A1 | 12/2013 | Altman et al. | |
| 2014/0059208 | A1 | 2/2014 | Yan et al. | |
| 2014/0201528 | A1* | 7/2014 | Krig | H04L 67/22 713/168 |
| 2014/0304412 | A1* | 10/2014 | Prakash | H04L 61/1511 709/226 |
| 2014/0310811 | A1 | 10/2014 | Hentunen | |
| 2015/0026809 | A1 | 1/2015 | Altman et al. | |
| 2015/0188949 | A1* | 7/2015 | Mahaffey | H04L 63/20 726/1 |
| 2015/0271031 | A1* | 9/2015 | Beevers | G06F 16/29 709/224 |
| 2015/0350229 | A1* | 12/2015 | Mitchell | G06F 16/955 726/23 |
| 2016/0142432 | A1 | 5/2016 | Manadhata et al. | |
| 2016/0164826 | A1* | 6/2016 | Riedel | H04L 61/1511 709/223 |
| 2016/0359887 | A1* | 12/2016 | Yadav | H04L 63/1425 |
| 2017/0041332 | A1* | 2/2017 | Mahjoub | H04L 61/1511 |
| 2017/0063929 | A1* | 3/2017 | Burbridge | H04L 61/1511 |
| 2017/0250946 | A1* | 8/2017 | Chan | H04L 61/1511 |
| 2017/0295196 | A1* | 10/2017 | Arnell | H04L 69/40 |
| 2017/0310709 | A1* | 10/2017 | Foxhoven | H04L 63/20 |
| 2018/0219912 | A1* | 8/2018 | Maslak | H04L 63/1441 |

FOREIGN PATENT DOCUMENTS

| | | |
|---|---|---|
| CN | 102624750 A | 8/2012 |
| JP | 2007251374 | 9/2007 |
| JP | 2011049745 | 3/2011 |
| JP | 2013157931 | 8/2013 |
| KR | 20140064410 | 5/2014 |
| WO | WO-2015065380 | 5/2015 |
| WO | WO-2015099635 | 7/2015 |
| WO | WO-2015163914 | 10/2015 |
| WO | WO-2015167523 | 11/2015 |
| WO | WO-2015178933 | 11/2015 |
| WO | WO-2015195093 | 12/2015 |

OTHER PUBLICATIONS

Beresnevichiene, et al., "DNS Data Analysis and Visualization System," May 26, 2015, 4 pages; Research Disclosure.

Bill Home, "Collecting, Analyzing and Responding to Enterprise Scale DNS Events," Jun. 15, 2015, 27th Annual FIRST Conference on Computer Security Incident Handling, 34 pages.

Data Sheet; "HP ArcSight DNS Malware€Analytics"; Aug. 2015; 2 pages.

Data Sheet; "HP Network Protector SDN Application Series"; Data Sheet, Apr. 2015; 4 pages.

Icann; "Monitor DNS Traffic & You Just Might Catch a Rat"; Sep. 22, 2014; 3 pages.

Kerner, S. M.; "HP Set to Deliver on SDN Vision"; Mar. 31, 2014; 1 page.

Manadhata, P.; "Extracted Data Classification to Determine If a DNS Packet Is Malicious," International Patent Application PCT/US2015/047497, filed Aug. 28, 2015.

Manadhata, P.; "Identification of a DNS Packet As Malicious Based on a Value," International Patent Application PCT/US2015/047524, filed Aug. 28, 2015.

OpenDNS,; From Wikipedia, the free encyclopedia, Aug. 13, 2015, pp. 1-8.

Palo Alto Networks: "Pao Alto Networks® DNS Protection Mechanisms"; Jul. 10, 2014; 2 pages.

Sander et al., "Collaborative Security Lists," International Patent App. PCT/US2015/013900, filed Jan. 30, 2015.

Wikipedia, "Hewlett Packard Enterprise Networking," May 17, 2015; 9 pages.

Zomlot et al., "Propagating Belief Information About Malicious and Benign Nodes," International Patent App. PCT/US2015/047380, filed Aug. 28, 2015.

Search Report and Written Opinion received for PCT Application No. PCT/US2015/047691, dated Jun. 13, 2016, 12 pages.

* cited by examiner

COLLECTING DOMAIN NAME SYSTEM TRAFFIC

BACKGROUND

Computer networks and the devices that operate on them often experience problems for a variety of reasons, e.g., due to misconfiguration, software bugs, and malicious network and computing device attacks. In a network services industry, e.g., where a service provider provides computing resources operating on a private network for use by various users, the size and complexity of a private network may make detecting problems with the network difficult. For example, a compromised computing device may operate in a malicious manner within a private network for a significant period of time before the malicious activity can be identified and handled.

BRIEF DESCRIPTION OF THE DRAWINGS

The following detailed description references the drawings, wherein.

DETAILED DESCRIPTION

Potentially problematic network activity may be identified by collecting domain name system (DNS) traffic. DNS queries and responses may be selectively obtained from a variety of computing devices and correlated, e.g., to identify and store a variety of information related to DNS traffic throughout a network. The ability to selectively obtain DNS traffic information from a variety of sources in a network allows a network administrator to monitor DNS traffic with a relatively light impact on network latency and storage requirements.

By way of example, a computing device may be in communication with agents implemented in intermediary network devices, such as routers, switches, and recursive resolvers, which are used throughout a private network. The computing device may provide each agent with instructions that cause the intermediary network device to either forward DNS packets to the computing device or to ignore DNS packets. The instructions may depend upon the topology of the network. For example, DNS query packets may be provided to the computing device by an agent of the first intermediary network device to which query packets are provided by one or more client computing devices. The agent of each other intermediary network device, e.g., those which do not receive DNS query packets directly from a client computing device, may be instructed to ignore DNS query packets. DNS response packets may be obtained from any of the intermediary network devices, e.g., depending upon the network topology and/or the expected impact such collection might have on latency.

The computing device may create a query record for each DNS query. Each query record may include, for example, the address of the client computing device from which the DNS query originated and the domain name being queried, e.g., "www.example.com." DNS response packets obtained by the computing device may be correlated with query records, e.g., by matching the queried domain names of the query records with the queried domain names specified by the DNS response packets. When a match is identified, the query records may be updated, e.g., by adding the resolved address of the query domain name to the query record.

Query records may be used, for example, for a variety of diagnostic and/or analytic purposes. In situations where a resolved IP address is identified as being malicious, query records may be used to identify which client device(s) queries the malicious domain. In some implementations, additional data may be obtained and stored in the query records. For example, the host associated with the client computing device from which a DNS query originated may be identified and stored in the query record, e.g., to identify potentially malicious hosts using multiple client computing devices. The collection of DNS traffic, and its potential uses, is described in further detail in the paragraphs that follow.

Figure 1:
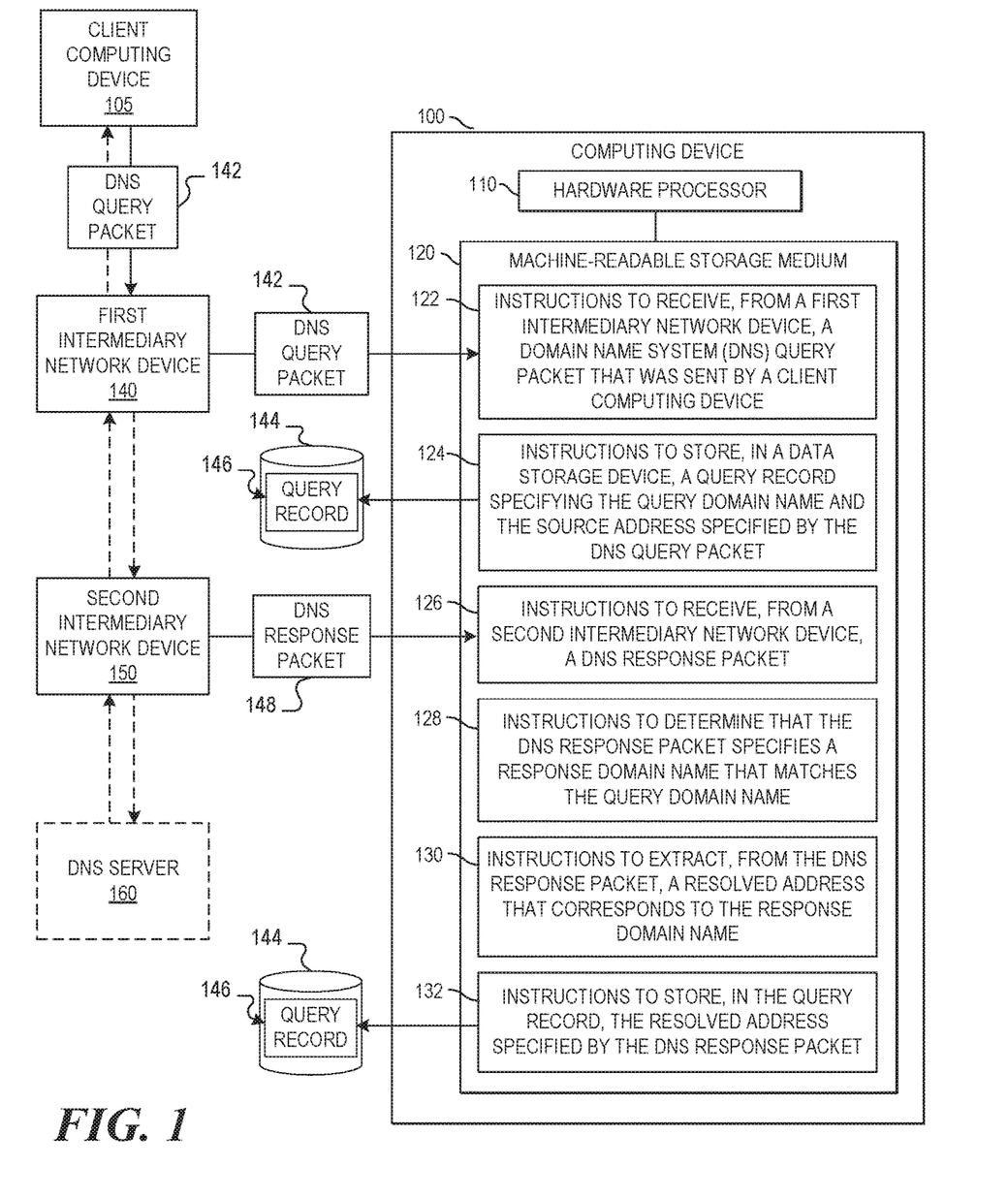
FIG. 1 is a block diagram of an example computing device for collecting domain name system traffic.

Referring now to the drawings, FIG. 1 is a block diagram of an example computing device 100 for collecting domain name system traffic. Computing device 100 may be, for example, a server computer, a personal computer, a mobile computing device, or any other electronic device suitable for processing network communications data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-132, to control the process for collecting DNS traffic. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-132, for network anomaly detection.

As shown in FIG. 1, the computing device 100 executes instructions 122 to receive, from a first intermediary network device 140 a DNS query packet 142 that was sent by a client computing device 105. The DNS query packet 142 specifies a query domain name, such as a universal resource locator (URL), and a source address, such as an internet protocol (IP) address, that specifies the client computing device 105. Client computing device 105 may be any end-point device included in a network and capable of sending DNS query packets, such as a server device, personal computing device, and/or mobile computing device. Intermediary network devices, such as the first intermediary network device 140, may include any device capable of handling DNS traffic, such as switches, routers, forwarders, recursive resolvers, and other similar devices.

The computing device 100 executes instructions 124 to store, in a data storage device 144, a query record 146 specifying the query domain name and the source address specified by the DNS query packet 142. The data storage device 144 may be any type of machine-readable storage medium. In FIG. 1, the data storage device 144 is depicted separately from the computing device 100; however, in some implementations, the data storage device 144 may be included in the computing device 100, e.g., as part of the machine-readable storage medium 120.

In the example depicted in FIG. 1, the DNS query packet 142 is generated by the client computing device and being routed to a DNS server 160 for domain name resolution. By way of example, the DNS query packet 142 may include a query for the domain name, www.example.com." The DNS query packet 142 may be routed through a variety of intermediary network devices before reaching a DNS server capable of resolving the domain name into an address, such as an IP address. The DNS server 160, upon resolving the address associated with the domain, "www.example.com," sends a DNS response packet, such as DNS response packet 148, back to the client computing device 105. By design, when DNS query and response packets are sent from one device to another, they are updated to specify new source and destination devices. For example, the DNS query packet 142 sent to the first intermediary network device 140 may be different from the DNS query packet forwarded to the second intermediary network device 150. In addition, the DNS response packet 148 provided by the DNS server may not identify the client computing device 105.

The computing device 100 executes instructions 126 to receive, from a second intermediary network device 150, a DNS response packet 148. The computing device 100 may examine the DNS response packet 148 to determine whether the DNS response packet corresponds to any recent DNS query recorded by the computing device 100. The determination may be made, for example, by comparing the domain names included in DNS response packets to the domain names included in query records created from data included in DNS query packets.

For example, the computing device 100 executes instructions 128 to determine that the DNS response packet 148 specifies a response domain name that matches the query domain name. E.g., the DNS response packet 148 may specify a response domain name of "www.example.com," which may match the query domain name, "www.example.com," stored in the query record 146.

In response to the determination, the computing device 100 executes instructions 130 to extract, from the DNS response packet 148, a resolved address that corresponds to the response domain name. For example, the DNS response packet 148 may include an IP address, "123.456.789.012," that corresponds to the domain, "www.example.com."

In some implementations, each query record is associated with a time to live (TTL) that may indicate a variety of things. For example, a TTL may be used when creating the query record 146 and used to determine how long the query record 146 will last before it is deleted. The computing device 100 may, for example, delete a query record that has exceeded its TTL before being associated with a resolved address. In some situations, a TTL may be used after the resolved address is associated with a query record, e.g., to indicate how long the record is to be kept. Some intermediary network devices, such as recursive resolvers, may send DNS queries for the same query domain name multiple times; using a TTL in the query record may prevent creation of multiple query records, e.g., if multiple DNS query packets with the same query domain name are provided to the computing device 100 by the recursive resolver within the record's TTL.

The computing device 100 executes instructions 132 to store, in the query record 146, the resolved address specified by the DNS response packet 148. For example, the query record 146 may be updated to include the resolved address, "123.456.789.012." While no single DNS packet received by an intermediary device includes i) the source of the DNS query, ii) the query domain name, and iii) the resolved address, the computing device 100 is able to collect and correlate all three pieces of information in a single query record.

While only two intermediary network devices are depicted in FIG. 1, in some implementations, the first and second intermediary network devices are included in multiple intermediary network devices through which DNS traffic passes. For example, a network may include many intermediary network devices through which DNS traffic may pass, from and to the client computing device 105 and/or other client computing devices. In this situation, the computing device 100 may provide an agent on each of the intermediary network devices with instructions to either i) provide DNS traffic to the computing device 100, or ii) ignore DNS traffic. Agents may be implemented in software executed by hardware of the intermediary network devices, distinct agent hardware, or a combination thereof. Instructions to provide DNS traffic to the computing device 100 may be instructions to forward DNS query packets, DNS response packets, or both, to the computing device 100. Instructions to ignore DNS traffic allow the intermediary network devices to process and route DNS traffic without the agent also causing the intermediary network devices to forward DNS traffic to the computing device 100.

In some implementations, the computing device 100 may use a network topography, which may specify the logical locations of some or all of the intermediary network devices within the network and the other network devices with which each device communicates, to provide instructions to various intermediary network devices. In the example of FIG. 1, the computing device 100 may identify, based on a network topography of the private network, at least one other intermediary network device through which the DNS query packet 142 is routed. The computing device 100 may then provide each other intermediary network device with instructions to whitelist DNS traffic, e.g., such that DNS traffic is not collected and/or forwarded from the corresponding other intermediary network device(s) to the computing device 100.

In some situations, the computing device 100 provides instructions for the selective forwarding of DNS traffic in a manner designed to limit the amount of resources used by both the intermediary network devices and the computing device 100. For example, an intermediary network device that is identifying and forwarding DNS traffic to the computing device 100 may use more resources than an intermediary network device that is not identifying and forwarding DNS traffic. Using more resources may cause an increase in latency, or response time, for network traffic traversing the corresponding intermediary network devices. By causing particular intermediary network devices to ignore DNS traffic, latency across the network may be improved. With respect to the resources of the computing device 100, reducing the quantity of DNS traffic sent to the computing device 100 may reduce the processing load as well as the storage capacity needed to store query records.

By way of example, the computing device 100 may determine, based on the network topography of the private network, that DNS traffic traversing the first intermediary network device 140 also traverses other intermediary network devices. In this situation, agents on each other intermediary network device may be provided with instructions to whitelist, or ignore, DNS query traffic, e.g., because an agent on the first intermediary network device 140 is already causing DNS query packets to be provided to the computing device 100. As another example, each intermediary network device aside from the second intermediary network device 150 may be provided with instructions to whitelist, or ignore, DNS response packets.

Query records created by the computing device 100 may be used for a variety of things. For example, the computing device 100 may receive, from a security event processor of the private network, data identifying a malicious IP address. The computing device 100 may search query records to identify any resolved addresses that might match the malicious IP address. In response to determining that the malicious IP address matches a resolved address, the security event processor may be provided with information included in the corresponding query record, such as the source address of the client computing device from which the DNS query originated. A client computing device querying a malicious domain may, in some situations, be indicative of malware operating on the client computing device.

In some implementations, additional information may be stored in query records. The additional information may be related to the query domain name, the source address, and/or the resolved address. For example, the computing device 100 may be able to determine, based on the source address of the client computing device 105, that the client computing device is operated by a particular host. In this situation, the computing device 100 may store, in the query record 146, data identifying the particular host. In some situations, a problem with a host may be identified based on the query records associated with that host.

In situations where many client devices and intermediary network devices are distributed throughout a network, many DNS queries and responses may be frequently handled by the computing device 100 and the intermediary network devices. In some implementations, the computing device 100 may use a cache to temporarily store information which facilitates selective collection of DNS traffic. For example, the computing device 100 may store, in a cache, a query domain name and its corresponding resolved address, e.g., to use for other query records that may be querying the same domain name. In situations where the resolved address of "www.example.com" is cached, the computing device 100 may complete a query record using only a DNS query packet and information stored in the cache, obviating the need to intercept and process DNS response packets for that domain name.

While described as separate intermediary network devices, the operations of the first and second intermediary devices could, in some implementations, be performed by a single device. For example, in situations where only one intermediary network device is used between the a client computing device and a DNS server, an agent on the intermediary network device could provide the computing device 100 with both the DNS query and the DNS response. In some implementations, an agent on the client computing device 105 and/or the DNS server may be capable of providing the computing device 100 with DNS queries and/or responses. In addition, the instructions executed by the computing device 100 need not be performed by a single device and may be performed by multiple computing devices. Other computing device configurations and/or combinations of devices may also be used to execute instructions for collecting DNS traffic.

Figure 2:
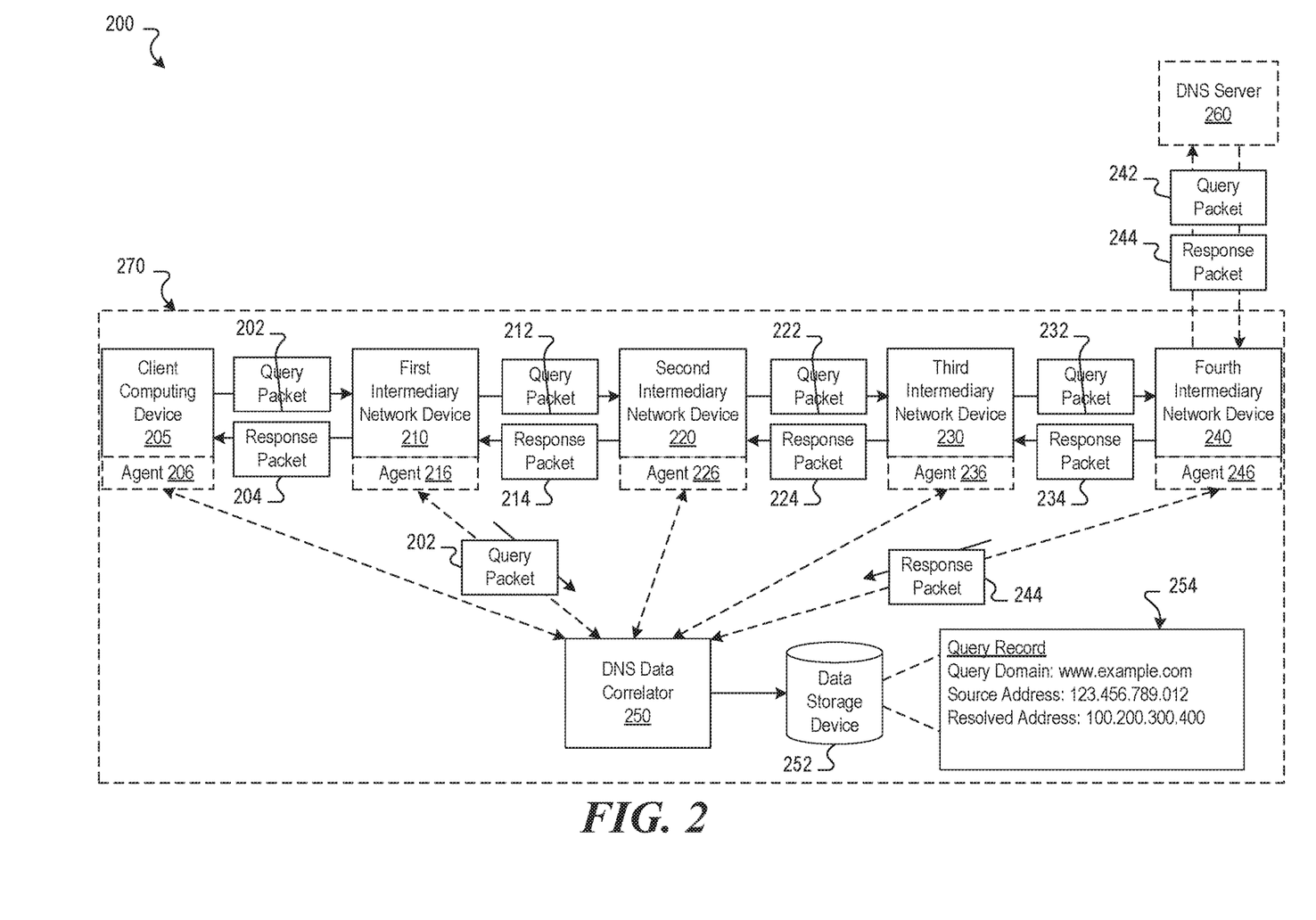
FIG. 2 is an example data flow for collecting domain name system traffic.

FIG. 2 is an example data flow 200 for collecting DNS traffic. The data flow depicts a DNS data correlator 250, which may be implemented by a computing device, such as the computing device 100 described above with respect to FIG. 1. The client computing device 205 may be any computing device suitable for network communications, such as a personal computer, mobile computer, virtual machine, server computer, or any combination thereof. For example, the client computing device 205 may be a virtual machine operating within a private cloud computing network 270 and managed by a host external to the private network 270. The client computing device 205 may be configured to perform various services and/or run various applications, e.g., as specified by the host.

During its operation, client computing device 205 may periodically communicate using various network communications protocols. DNS queries are one form of network communications that may originate from the client computing device 205, e.g., in the form a query packet 202. The query packet 202 may specify the client computing device 205 as the source of the packet, e.g., using an IP address, and is destined for a DNS server, such as DNS server 260, which will perform domain name resolution. For example, a DNS query packet may be issued to identify the IP address of "www.example.com," While the DNS server 260 is depicted as being outside of the private network 270, in some implementations, one or more DNS servers may be included in the private network 270.

In the example data flow 200, the query packet 202 passes through multiple intermediary network devices on its way to the DNS server 160. As described above, a variety of intermediary network devices may be used, e.g., switches, routers, forwarders, recursive resolvers, and others. Upon receipt of the query packet 202, the first intermediary network device 210 modifies the query packet 202, e.g., to identify itself as the source, before forwarding the modified query packet 212 to the second intermediary network device 220. The second intermediary network device 220 provides a similarly modified query packet 222 to the third intermediary network device 230, which in turn provides a modified query packet 232 to the fourth intermediary network device 240. The fourth intermediary network device 240 provides its modified query packet 242 to a DNS server 260 to identify the IP address for "www.example.com." While the query packet 202 may be modified as it passes through various devices, the query domain name remains the same.

After resolving the address of "www.example.com," the DNS server provides the fourth intermediary network device 240 with a response packet 244 specifying, for example, the query domain name and the resolved address. As with the query packet, the intermediary network devices may modify the response packet as it is sent back through the other intermediary network devices on its way to the client computing device 205. For example, the fourth intermediary network device 240 provides the third intermediary network device 230 with a modified response packet 234, which provides a further modified response packet 224 to the second intermediary network device 220, which in turn provides a modified response packet 214 to the first intermediary network device 210. The first intermediary network device 210 then sends its modified response packet 204 to the client computing device 205. While the response packet 244 may be modified as it passes through various devices, the query domain name and resolved address remain the same.

In the example data flow 200, the client computing device 205 and each intermediary network device have a corresponding agent, e.g., agents 206, 216, 226, 236, and 246 for, respectively, the client computing device 205 and the first, second, third, and fourth intermediary network devices. As described above, each agent may be implemented in software executed by hardware of its corresponding device, implemented in hardware, or implemented in a combination of hardware and software. For example, the agents of FIG. 2 may be implemented by programmable hardware, such as a field-programmable gate array (FPGA) or application specific integrated circuit (ASIC).

In the example data flow 200, the DNS data correlator 250 may identify the intermediary network devices and provide instructions to the agents of one or more of the devices. For example, the first agent 216 of the first intermediary network device 210 may be instructed to provide received query packets, such as query packet 202, to the DNS data correlator 250. In addition, the fourth agent 246 of the fourth intermediary network device 240 may be instructed to provide received response packets, such as response packet 244, to the DNS data correlator 250. The other agents, e.g., agents 206, 226, and 236, may be instructed to ignore DNS traffic.

In the above example situation, as depicted in the example data flow 200, the first agent 216 causes the first intermediary network device 210 to send, to the DNS data correlator, the query packet 202 it received from the client computing device 205. The second agent 226, third agent 236, and fourth agent 246 all ignore the query packet as it passes through their corresponding intermediary network devices. As noted above, the query packet 202 specifies the query domain, www.example.com," and the source address, e.g., the address of the client computing device 205. The DNS data correlator 250, responsive to receipt of the query packet 202, creates a query record 254 on a data storage device 252, and stores the query domain, "www.example.com," and source address, e.g., "123.456.789.012," in the query record 254.

When the response packet 244 is sent to the fourth intermediary network device 240 by the DNS server 260, the fourth agent 246 causes the fourth intermediary network device 240 to send the response packet 244 to the DNS data correlator. The response packet 244 includes the query domain name, "www.example.com," and the resolved address, e.g., "100.200.300.400," for the query domain name. The address of the client computing device 205, however, may not be included in the response packet 244.

Responsive to the receipt of the response packet 244, the DNS data correlator may determine whether the response packet 244 specifies a domain name that matches the query domain name included in a query record. In this example, the domain name included in the response packet, "www.example.com," matches the one included in the query record 254. In response to the determination, the DNS data correlator 250 extracts, from the response packet 244, the resolved address, e.g., "100.200.300.400." The DNS data correlator 250 then stores the resolved address in the query record 254. The second agent 226, third agent 236, and fourth agent 246 all ignore the response packet as it passes through their corresponding intermediary network devices.

The example data flow 200 depicts the sending and receipting of one DNS query and response, and the selective collection of the query and response by the DNS data correlator 250. Many DNS queries and responses may be selectively collected in this manner. Performing the collection of DNS traffic in this way may have an advantage over collection of DNS traffic at every possible point, e.g., by reducing processing requirements for various intermediary network devices and the DNS data correlator. Collecting DNS queries and responses from separate devices may have an advantage over collection at a single point, e.g., by reducing the processing requirements of any single intermediary network device, which may improve latency.

In some implementations, the DNS data correlator 250 may store long term query records for analytical or other purposes. For example, historical domain resolutions may be compared to recent resolutions to determine when the address(es) associated with a particular domain name have changed.

In some situations, many other client computing devices and other intermediary network devices may be used, separately or in conjunction with the example devices, to route DNS traffic throughout the private network 270. As with the example shown in FIG. 2, the DNS data correlator may continue to selectively provide instructions to receive particular DNS packets or types of DNS packets from particular intermediary network devices.

Figure 3:
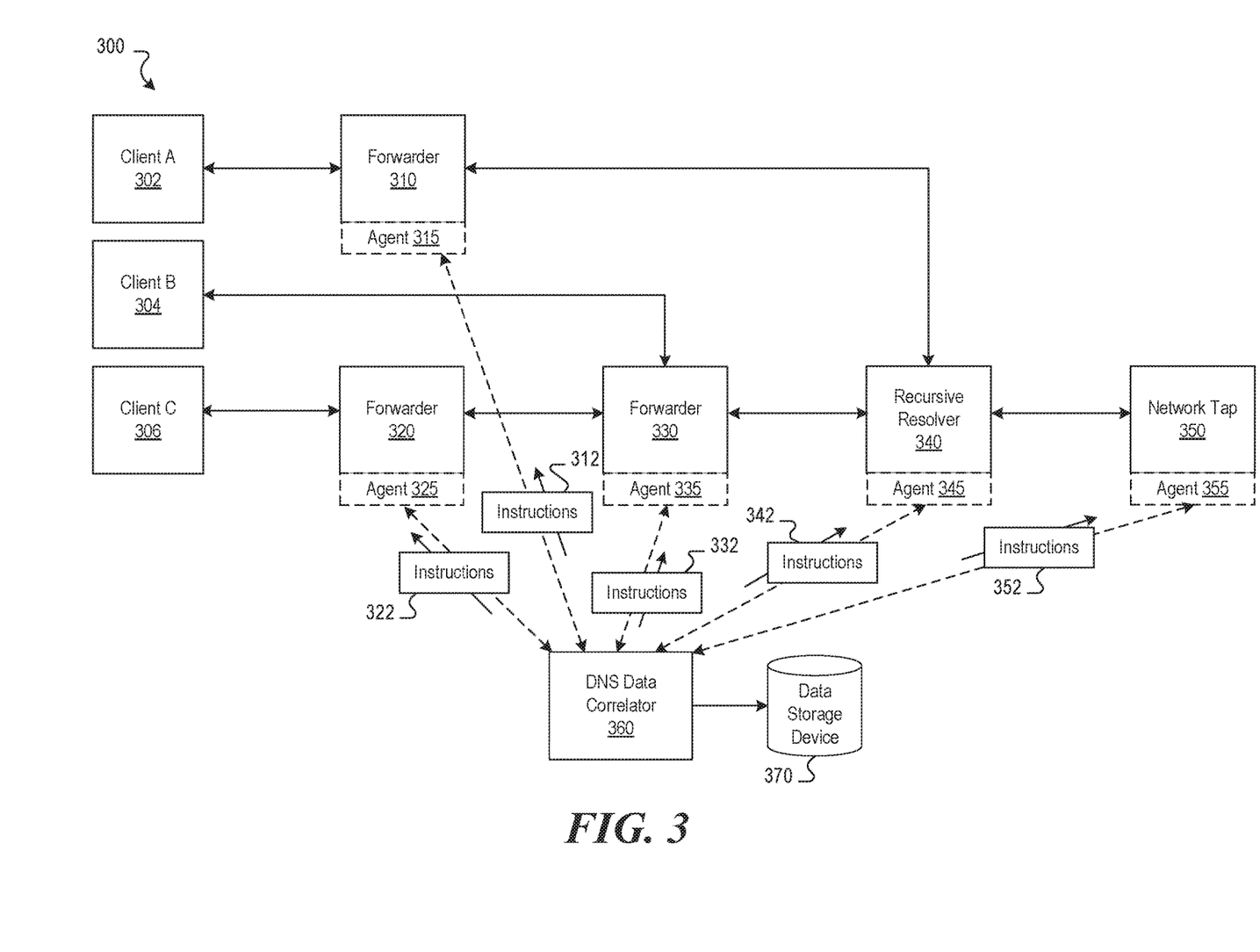
FIG. 3 is an example data flow for providing instructions for collecting domain name system traffic.

FIG. 3 is an example data flow 300 for providing instructions for collecting domain name system traffic. The example data flow 300 depicts three client computing devices, client A 302, client B 304, and client C 306 which each communicate with various intermediary network devices when sending and receiving DNS traffic. The example intermediary network devices include several forwarders, 310, 320, and 330, which include corresponding agents 315, 325, and 335; a recursive resolver 340 with its corresponding agent 345; and a network tap 350 with its corresponding agent 355.

In the example data flow 300, the DNS Data Correlator 360 provides instructions to the agents of the various intermediary network devices for collection of DNS traffic. By way of example, the instructions 312, 322, and 332 provided to the agents of the forwarders 310, 320, and 330, may cause the forwarders to send DNS query packets to the DNS data correlator 360 while ignoring, or whitelisting, DNS response packets. The instructions 342 provided to the agent 345 of the recursive resolver 340 may cause the recursive resolver 340 to send DNS response packets to the DNS data correlator 360 while ignoring, or whitelisting, DNS query packets. The instructions 352 provided to the agent 355 of the network tap 350 may cause the network tap to ignore, or whitelist, all DNS traffic, e.g., sending neither DNS queries nor responses to the DNS data correlator 360.

The manner in which the DNS data correlator determines which instructions to provide which devices may vary. In some implementations, a system administrator may specify which devices are provided with which instructions and/or implement rules that cause the DNS data correlator 360 to provide specific instructions in specific circumstances. In some implementations, the instructions may depend upon the topology of the network. The network topology may, for example, be stored in a data storage device 370 with which the DNS data correlator 360 is in communication. The DNS data correlator 360 may, for example, instruct agents to collect and forward DNS query packets only when the corresponding intermediary network device is the first intermediary network device to which a client device sends a DNS query packet. As another example, the DNS data correlator 360 may instruct agents to ignore DNS response packets when the network topology indicates that the corresponding intermediary network device is logically positioned such that another intermediary network device is logically closer to a DNS server.

Instructions may be determined in many other ways and, in some implementations, may be periodically updated, e.g., as the topology changes. For example, as client devices and intermediary network devices are added, removed, or configured differently, the network topology may change. In these situations, the DNS data correlator 360 may provide updated instructions to various devices regarding the collection and forwarding of DNS traffic.

While not depicted in FIGS. 2 and 3, additional devices may be in communication with the DNS data correlator 250 and 360 to provide additional network services, e.g., as described above. For example, and security event processor may be in communication with the DNS data correlator 250 and/or the data storage device 252, e.g., to identify particular client computing devices that may be issuing DNS queries to malicious domains. As another example, an analytics device may be in communication with the DNS data correlator and/or the data storage device 252 to identify patterns in DNS traffic, which may be used for a variety of purposes.

Figure 4:
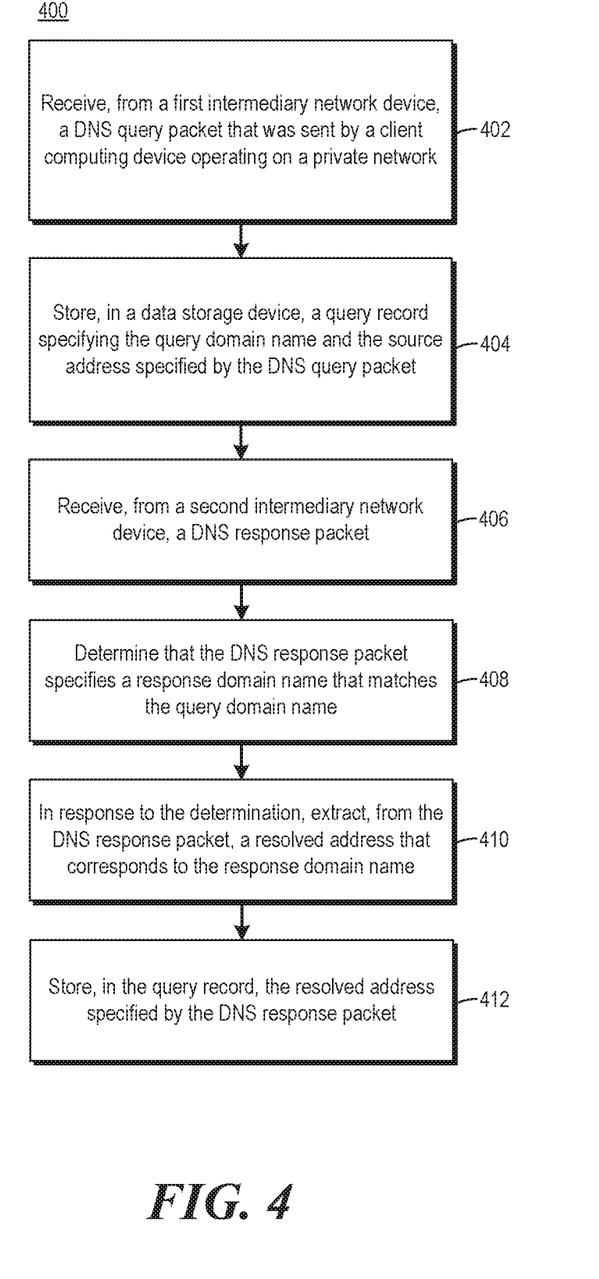
FIG. 4 is a flowchart of an example method for collecting domain name system traffic.

FIG. 4 is a flowchart of an example method 400 for collecting DNS traffic. The method 400 may be performed by a computing device, such as a computing device described in FIG. 1. Other computing devices may also be used to execute method 400. Method 400 may be implemented in the form of executable instructions stored on a machine-readable storage medium, such as the storage medium 120, and/or in the form of electronic circuitry.

A DNS query packet that was sent by a client computing device operating on a private network is received from a first intermediary network device (402). The DNS query packet specifies a query domain name and a source address that specifies the client computing device. For example, a personal computer may issue a DNS query that includes the domain name, "www.exampledomain.com," and the source address, "111.222.333.444." The DNS query may be routed through a forwarder that includes an agent that causes the DNS query packet to be sent to a DNS data correlator.

A query record specifying the query domain name and the source address specified by the DNS query packet is stored in a data storage device (404). For example, a DNS data correlator may create a query record, which specifies the query domain name, "www.exampledomain.com," and the source address, "111.222.333.444," and store that query record in a machine-readable storage medium.

A DNS response packet is received from a second intermediary network device (406). For example, the second intermediary network device may be a network tap at the edge of the private network, and an agent of the network tap may cause the network tap to forward the DNS response packet to the DNS data correlator.

It is determined, e.g., by the DNS data correlator, that the DNS response packet specifies a response domain name that matches the query domain name (408). For example, the DNS data correlator may determine that the DNS response packet include the response domain name, "www.exampledomain.com," which matches the query domain name included in the query record.

In response to the determination, a resolved address that corresponds to the response domain name is extracted from the DNS response packet (410). For example, the DNS response packet may include the resolved address, "90.80.70.60," which corresponds to "www.exampledomain.com." The DNS data correlator may extract the resolved address from the DNS response packet.

The resolved address specified by the DNS response packet is stored in the query record (412). For example, the query record for "www.exampledomain.com," which include the source address for the client computing device that issued the query, is updated to include the resolved address of the query domain, e.g., "90.80.70.60."

The foregoing disclosure describes a number of example implementations for collecting DNS traffic. As detailed above, examples provide a mechanism for selectively obtaining DNS queries and responses from various intermediary network devices throughout a network, correlating the information contained therein, and potential applications of a system that is capable of collecting and correlating the DNS traffic in such a manner.

We claim:

1. A non-transitory machine-readable storage medium encoded with instructions executable by a hardware processor of a computing device to cause the hardware processor to:
  receive, from a first intermediary network device, a DNS query packet that was sent by a client computing device operating on a private network, the DNS query packet specifying i) a query domain name, and ii) a source address that specifies the client computing device, wherein the DNS query packet is communicated from the client computing device to a DNS server through a network of intermediary network devices including the first intermediary device, the first intermediary network device modifies the DNS query packet to provide a modified DNS query packet that identifies the first intermediary as a source of the modified DNS query packet, and the first intermediary network device provides the modified DNS query packet to the network of intermediary network devices for forwarding to the DNS server;
  store, in a data storage device, a query record specifying the query domain name and the source address specified by the DNS query packet;
  receive, from a second intermediary network device of the network of intermediary network devices, a DNS response packet;
  determine that the DNS response packet specifies a response domain name that matches the query domain name;
  in response to the determination, extract, from the DNS response packet, a resolved address that corresponds to the response domain name; and
  store, in the query record, the resolved address specified by the DNS response packet.

2. The storage medium of claim 1, wherein the instructions further cause the hardware processor to:
  provide an agent on each of the plurality of intermediary network devices with one of:
    instructions to provide DNS traffic to the computing device; or
    instructions to ignore the DNS traffic.

3. The storage medium of claim 1, wherein the instructions further cause the hardware processor to:
  identify, based on a network topography of the private network, at least one other intermediary network device through which the DNS query packet is routed; and
  provide an agent on each of the at least one other intermediary network device with DNS traffic whitelist instructions.

4. The storage medium of claim 3, wherein the instructions further cause the hardware processor to:

determine, based on the network topography of the private network, that DNS traffic traversing the first intermediary network device also traverses each of the at least one other intermediary network device, and wherein each agent is provided the DNS traffic whitelist instructions in response to the determination that the DNS traffic traversing the first intermediary network device also traverses each of the at least one other intermediary network device.

5. The storage medium of claim 1, wherein the instructions further cause the hardware processor to:
receive, from a security event processor, data identifying a malicious domain address;
determine that the malicious domain address matches the resolved address stored in the query record; and
in response to the determination, provide the security event processor with data identifying the source address specified by the query record.

6. The storage medium of claim 1, wherein the DNS response packet does not specify the source address of the client computing device.

7. The storage medium of claim 1, wherein the instructions further cause the hardware processor to:
obtain, for the query record, additional information related to one of:
the query domain name;
the source address; or
the resolved address; and
store, in the query record, the additional information.

8. The storage medium of claim 1, wherein the instructions are executable by the hardware processor to further cause the hardware processor to:
provide, to a first agent on the first intermediary network device, instructions to capture DNS query packets; and
provide, to a second agent on the second intermediary network device instructions to capture DNS response packets.

9. A computing device comprising:
a hardware processor; and
a data storage device storing instructions that, when executed by the hardware processor, cause the hardware processor to:
identify a plurality of intermediary network devices through which DNS traffic flows between a client computing device and a DNS server;
provide, to a first agent on a first intermediary network device of the plurality of intermediary network devices, instructions to capture DNS query packets;
provide, to a second agent on a second intermediary network device of the plurality of intermediary network devices, instructions to capture DNS response packets;
provide, to an agent on each other intermediary network device included in the plurality of intermediary network devices, instructions to ignore DNS traffic;
receive, from the first intermediary network device, a DNS query packet that was sent by the client computing device, the DNS query packet specifying i) a query domain name, and ii) a source address that specifies the client computing device;
store, in a data storage device, a query record specifying the query domain name and the source address specified by the DNS query packet;
receive, from the second intermediary network device, a DNS response packet;
determine that the DNS response packet specifies a response domain name that matches the query domain name;
in response to the determination, extract, from the DNS response packet, a resolved address that corresponds to the response domain name; and
store, in the query record, the resolved address specified by the DNS response packet.

10. The computing device of claim 9, wherein the instructions further cause the hardware processor to:
identify at least one other intermediary network device through which the DNS query packet is routed based on a network topography of a private network that includes the client computing device, the first intermediary network device, and the second intermediary network device; and
provide an agent on each of the at least one other intermediary network device with DNS traffic whitelist instructions.

11. The computing device of claim 10, wherein the instructions further cause the hardware processor to:
determine, based on the network topography of the private network, that DNS traffic traversing the first intermediary network device also traverses each of the at least one other intermediary network device, and wherein each agent is provided the DNS traffic whitelist instructions in response to the determination that the DNS traffic traversing the first intermediary network device also traverses each of the at least one other intermediary network device.

12. The computing device of claim 9, wherein the instructions further cause the hardware processor to:
receive, from a security event processor, data identifying a malicious domain address;
determine that the malicious domain address matches the resolved address stored in the query record; and
in response to the determination, provide the security event processor with data identifying the source address specified by the query record.

13. A method comprising:
receiving, by a hardware processor, from a first intermediary network device, a DNS query packet that was sent by a client computing device operating on a private network, the DNS query packet specifying i) a query domain name, and ii) a source address that specifies the client computing device, wherein the DNS query packet is communicated from the client computing device to a DNS server through a network of intermediary network devices including the first intermediary device, the first intermediary network device modifies the DNS query packet to provide a modified DNS query packet that identifies the first intermediary as a source of the modified DNS query packet, the first intermediary network device provides the modified DNS query packet to the network of intermediary network devices for forwarding to the DNS server;
storing, by the hardware processor, in a data storage device, a query record specifying the query domain name and the source address specified by the DNS query packet;
receiving, by the hardware processor, from a second intermediary network device, a DNS response packet;
determining, by the hardware processor, that the DNS response packet specifies a response domain name that matches the query domain name;

in response to the determination, extracting, by the hardware processor, from the DNS response packet, a resolved address that corresponds to the response domain name;

storing, by the hardware processor, in the query record, the resolved address specified by the DNS response packet;

identifying, by the hardware processor, at least one other intermediary network device through which the DNS query packet is routed based on a network topography of the private network that includes the client computing device, the first intermediary network device, and the second intermediary network device; and providing, by the hardware processor, an agent on each intermediary network device of the at least one other intermediary network device with DNS traffic whitelist instructions.

14. The method of claim 13, wherein:

the first intermediary network device, the second intermediary network device, and each of the at least one other intermediary network device are included in a plurality of intermediary network devices through which DNS traffic passes; and the method further comprises:
providing an agent on each of the plurality of intermediary network devices with one of:
instructions to provide the DNS traffic to a computing device associated with the data storage device; or
instructions to ignore the DNS traffic.

15. The method of claim 13, further comprising:

determining, based on the network topography of the private network, that DNS traffic traversing the first intermediary network device also traverses each of the at least one other intermediary network device, and wherein each agent is provided the DNS traffic whitelist instructions in response to the determination that the DNS traffic traversing the first intermediary network device also traverses each of the at least one other intermediary network device.

16. The method of claim 13, further comprising:

receiving, from a security event processor, data identifying a malicious domain address;

determining that the malicious domain address matches the resolved address stored in the query record; and in response to the determination, providing the security event processor with data identifying the source address specified by the query record.

17. The method of claim 13, further comprising:

the hardware processor providing, to a first agent on the first intermediary network device, instructions to capture DNS query packets; and providing, by the hardware processor, a second agent on the second intermediary network device to capture DNS response packets.

* * * * *